Dec. 19, 1944.   J. MacMANUS   2,365,349
MANUFACTURE OF COFFEE RINGS
Filed Feb. 25, 1941   2 Sheets-Sheet 1
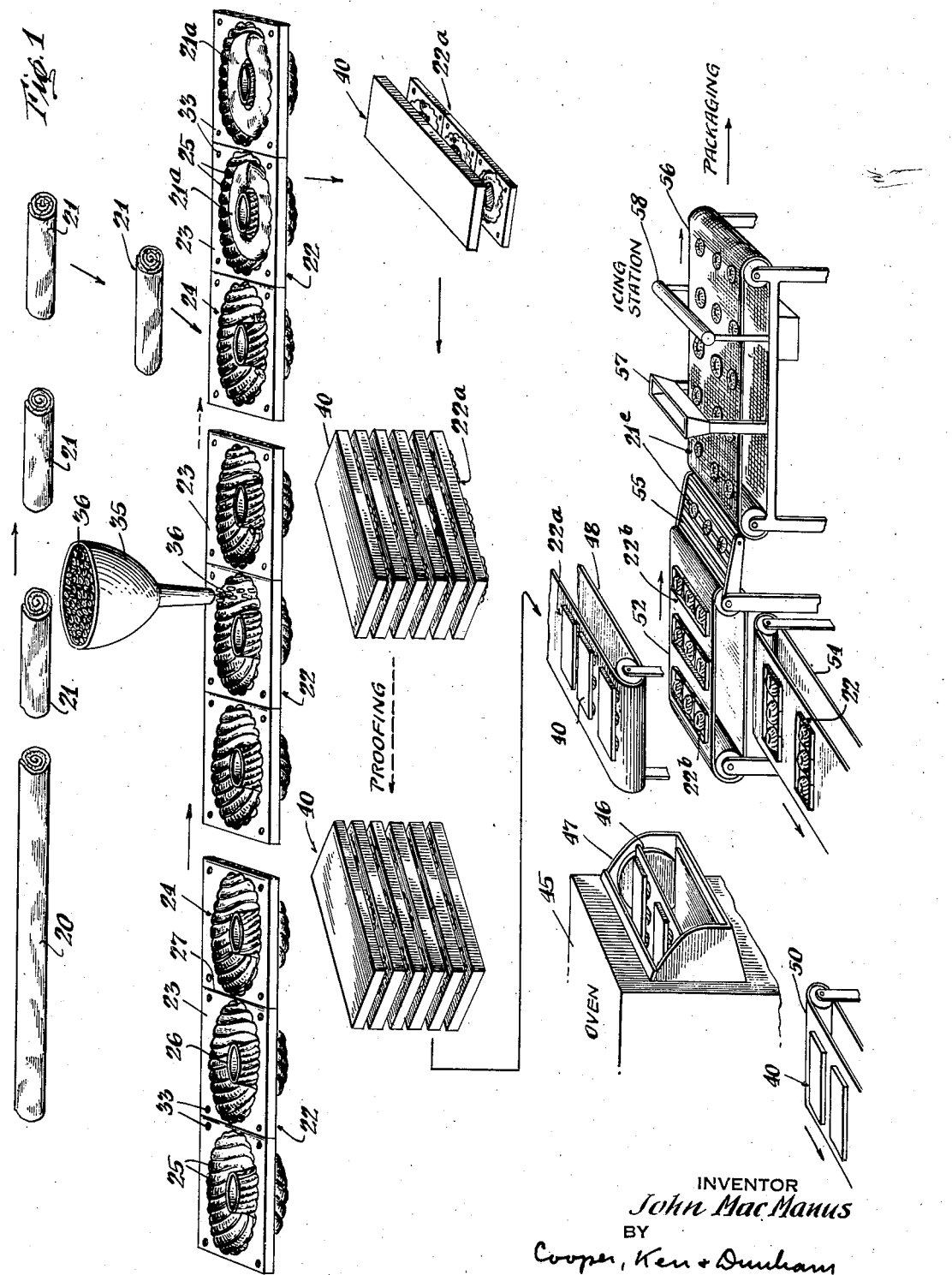
INVENTOR
John MacManus
BY
Cooper, Kerr & Dunham
ATTORNEYS Dec. 19, 1944.  J. MacMANUS  2,365,349
MANUFACTURE OF COFFEE RINGS
Filed Feb. 25, 1941  2 Sheets-Sheet 2
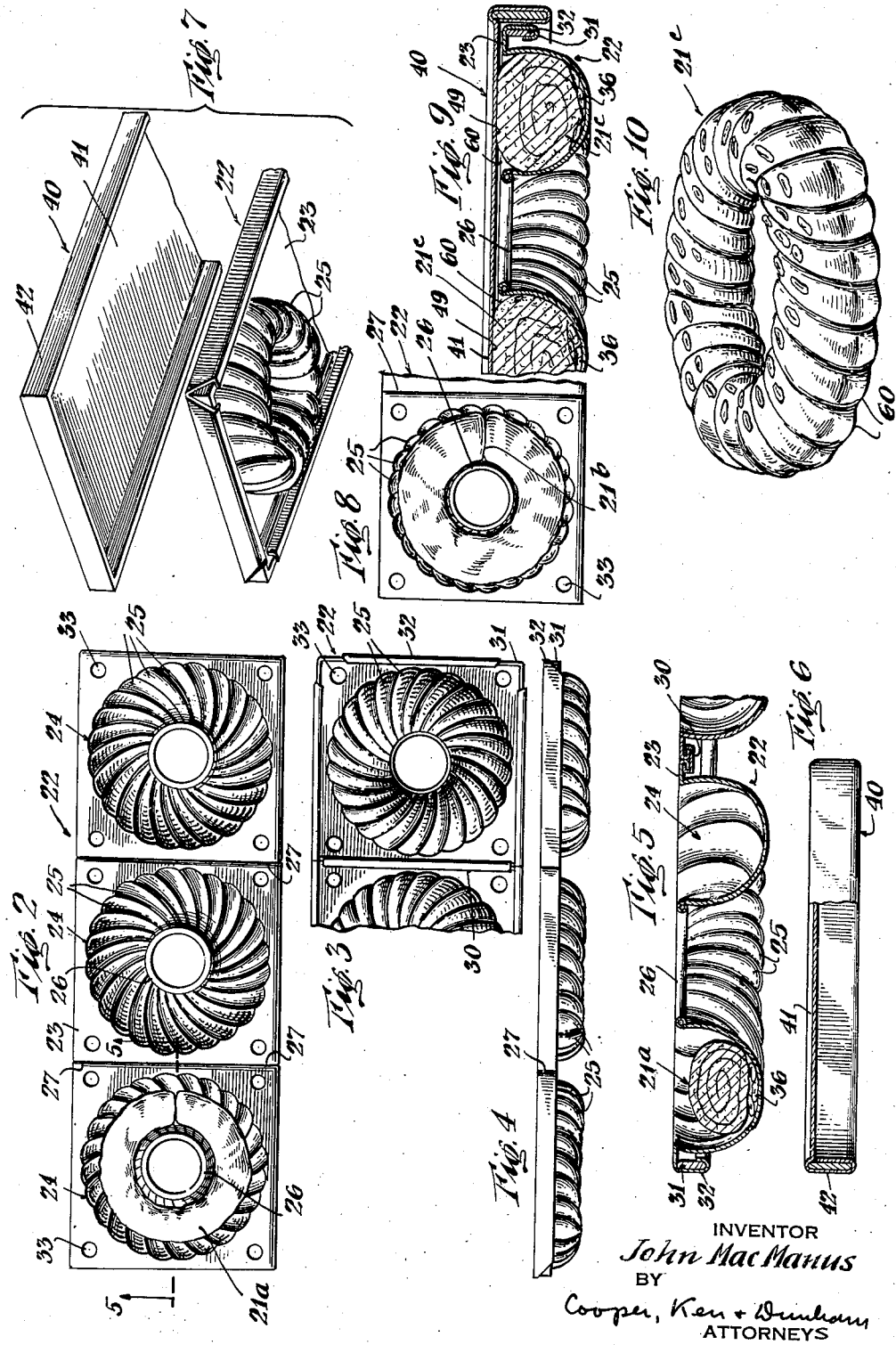
INVENTOR
John MacManus
BY
Cooper, Kent + Dunham
ATTORNEYS Patented Dec. 19, 1944

2,365,349

UNITED STATES PATENT OFFICE 2,365,349

MANUFACTURE OF COFFEE RINGS

John MacManus, Yonkers, N. Y., assignor to Cushman's Sons, Inc., New York, N. Y., a corporation of New York Application February 25, 1941, Serial No. 380,424

2 Claims. (Cl. 107—54)

This invention relates to the manufacture of coffee ring and other bakery products, and more particularly to procedure and apparatus for use in commercial baking establishments and preferably for operation in a substantially continuous manner, to prepare, bake and finish products such as coffee ring, articles of analogous structure, and various other pastries and baked goods.

Although many of the present improvements are applicable to the manufacture of other articles, the invention may be conveniently illustrated and explained by reference to coffee ring, which is not only a popular product but is a type of article to which the invention, in an important specific aspect, is very advantageously directed. Heretofore, according to my experience, the usual bakery practice for making coffee rings or other twisted and ring-shaped articles has involved manipulation of the dough into twisted, rope-like portions into which have been rolled or folded the desired cinnamon, sugar, raisins or other ingredients. Each twisted portion is then bent around into a circular configuration and its ends are manually fastened together by interlocking or doubly overlapping twist. Ordinarily such articles are dressed with pecan halves or other nuts, and if the nuts are applied before baking, the practice has been to give the finished but unbaked ring a thin egg or liquid coating and then to sprinkle the nuts on by hand; the coating being intended to make the nuts adhere during subsequent operations.

Before baking, the formed articles must be proofed, and to that end they are suitably stored in racks or trays for the desired time and in the desired atmospheric conditions. Thereupon, the articles are transferred to the oven, being then or previously placed in plain shallow rectangular pans, usually five or more articles per pan. Upon removing the pans from the oven, the baked rings must be lifted from the pans and then subjected to the desired finishing treatments, e. g., on their upper and side surfaces. These may include a further sugar wash, application of nuts or other supplementary materials (if not applied before baking), and usually the application of an icing composition.

All of these operations involve a great deal of manipulation and handling of the coffee rings themselves throughout the procedure, from the twisting, shaping and end-fastening of the dough lengths to the handling, spraying and dipping of the baked rings, and are likely to involve much contamination or waste of icing compositions or other materials. For example, when the nuts, which are a relatively expensive commodity, are sprinkled on (either before or after baking) a number of them fail to land in place, many fall off during the subsequent handling operations, and still others drop into or with the icing composition, contaminating both the latter and the nuts themselves; attempts to salvage the nuts or like materials are costly, time-consuming, and relatively unsatisfactory, especially where the materials have been contaminated with sugar wash or icing.

Accordingly, important objects of the present invention are to obviate or reduce the difficulties inherent in prior procedures for making products of the stated character; further objects being to reduce the number of operations required, to provide simplified apparatus, to reduce waste of time and materials, and to facilitate operation in a much more rapid, more economical and more substantially continuous fashion than has hitherto been possible. Another object is to provide an improved pan and pan assembly for handling and baking articles of the character described, affording the production of goods more uniform in size, appearance and quality and facilitating the achievement of improvements in the bakery operation as hereinabove set forth.

Other objects include such as are hereinafter stated, or are represented by attainment of the further advantages, economies and improvements hereinafter set forth, or are incidental to or achieved by the use and practice of the several features of improvement described.

The invention may be conveniently explained by reference to a specific instance thereof, set forth by way of example. Accordingly, the annexed drawings illustrate certain presently preferred embodiments of the invention as applied to the manufacture of coffee ring and like products, as follows:

Fig. 1. is a pictorial flow diagram illustrating, in perspective views, the progress of the shaped dough and the pans in which it is placed, through successive forming, pre-treating, baking and finishing operations;

Fig. 2 is a plan view of what is normally the upper side of a pan embodying the present invention and susceptible of use in the procedure of Fig. 1;

Fig. 3 is a plan view of the opposite or under side of the pan;

Fig. 4 is a side elevation of the pan;

Fig. 5 is an enlarged section on line 5—5 of a part of the pan in Fig. 1;

Fig. 6 is a side elevation with one skirt partly broken away, of a cover for the pan of Figs. 2 to 5;

Fig. 7 is a perspective fragmentary view showing the relation of the cover to the pan;

Fig. 8 is a fragmentary view similar to Fig. 2, showing the formed dough ring after proofing;

Fig. 9 is a fragmentary sectional view, generally similar to Fig. 5, with the cover applied and a coffee ring therein after baking; and Fig. 10 is a perspective view of the baked coffee ring.

Referring to Fig. 1: A preliminary step in the manufacture of coffee ring, for example, is the formation of bars or rods of dough embodying such further ingredients, e. g., sugar, cinnamon, raisins and so forth, as may be desired. Among various procedures which may be used to make these bars, a convenient method is to produce a continuous rod or tube 20 formed by rolling up a continuous strip of dough on which the desired ingredients have been spread or sprinkled. Thereupon, the rod is cut into successive sections 21 of suitable length, say about equal to or slightly longer than the mean circumferential dimension of the coffee ring eventually to be produced.

An important feature of the process involves the disposition of the dough rods in pans of the character exemplified in the drawings. Referring now more particularly to Figs. 2 to 5 inclusive, it will be seen that the pan 22 comprises a flat upper surface 23 with annular or semitoroidal depressions 24 therein, which preferably but not necessarily bulge sidewise below (i. e., somewhat underlie) the adjacent edges of the surface 23 as shown. Although single pans or pans of other capacities may be used, the illustrated pan has, for example, three such depressions and as will now be seen, each is conveniently of the configuration desired for top and sides of the final baked coffee ring. To simulate or enhance the twisted appearance in the finished product, each of the annular cavities 24 has a series of spiral-shaped flutings 25, curving from the outer edge of the cavity around the bottom and up to the inner beaded ring 26 which is conveniently flush with the surface 23. The pan may be made, for instance, of suitable sheet metal (say, steel) susceptible of shaping in a draw press to the desired configuration; for convenience of manufacture the pan may, if desired, be made of three separate seamless sections or sheets joined at 27, 27 by a suitably interlocking connector strip 30, as shown more specifically in Figs. 3 and 5. For reinforcement, a heavy band or ribbon 31 of steel may be mounted behind and retained by a skirt 32 about the periphery of the pan; and for better baking action in the oven, and particularly for better circulation of heated air under the cover (hereinafter described) when the baking article slightly raises the latter, apertures such as the holes 33 may be provided in the surface sheet 23.

Returning now to Fig. 1, it may be explained that a series of pans 22, of the character described, are advanced for the successive insertion therein of the shaped dough portions 21. Conveniently enroute to the point of dough insertion, the nuts or nut fragments or other dressing materials to be embedded in or attached to the upper surface of the finished coffee ring, are placed in the bottom of pan cavities 24. Thus for example, from a suitably spouted container 35 or the like, nuts 36 (preferably moist to promote subsequent adherence to the dough) are sprinkled into each of the cavities, in the desired quantity. Thereupon the shaped bars or rods of dough 21 are simply bent around and placed in the cavities 24 as shown at 21a in Fig. 1 and at the left-hand side of Fig. 2. It will be noted that the ends of the bar need not be twisted or tied together, but can be merely left in approximate abutment (as shown), or in some cases simply overlapped.

After insertion of the bars 21, each pan is provided with a cover 40, and the assemblies are transferred to the proofing station or apparatus. Referring more particularly to Figs. 6 and 7, it will be seen that the cover may consist simply of a rectangular sheet metal member of the style of a box cover, having a flat or horizontal portion 41 and shallow side walls or skirts 42, preferably of reinforced character. Advantageously the skirts 42 of the cover have a relatively loose fit about the skirts 32 of the pan. In order to prevent undue displacement of the covers during baking operation, and to enhance their molding effect, it is desirable to make them of relatively heavy stock, and of suitable rigidity to resist distortion during the baking or other operations. Although for reasons now or hereinbelow made apparent such a cover is very advantageous, many desirable results of the procedure may be achieved without any cover; but when a cover is omitted, it is usually expedient to squeeze or twist the ends of each dough bar together at the time it is bent into a loop to be put into the pan.

As an example of size, one generally satisfactory type of pan has been made, with over-all horizontal dimensions of 27 inches by 9 inches and containing three ring cavities each approximately 8½ inches in outside diameter, 2⅞ inches inside diameter and 2 inches deep, and provided with a weighted cover adapted to abut the pan flatly on top and loosely around the edges, as described; but it will be understood that various other dimensions, proportions and configurations may be employed, depending upon the requirements of use.

As explained, the covers 40 are applied to the filled pans 22a (Fig. 1), and the proofing operation, as desired, is thereupon carried out. For illustration, the drawings show merely the filled and covered pans 22a stacked for this operation. Various proofing apparatus may be used; for example, particularly convenient handling of the covered pans during this (and likewise other stages) of the invention may be obtained with procedure and apparatus of the character described and claimed in my United States Patents Nos. 2,187,354 and 2,187,355, issued January 16, 1940, for Procedure and apparatus, respectively, for the manufacture of baked goods; it being understood that in adapting the inventions of the stated patents to the present use, the covered pans 22 are cross-stacked, singly, or in pairs or multiples side by side, in the same manner as the simple rectangular pans shown by way of example in the cited patents.

Following the proofing operation, the covered pans 40—22a are brought to the oven, generally designated 45, for baking. For convenience of illustration, the oven is only shown at its loading and unloading end, and it will be understood that any of a variety of oven constructions may be employed, preferably one of the continuous traveling tray type. The pans are loaded on to the trays 46 of the oven through a suitable loading and unloading extension 47, and subjected to the baking operation. As shown, the pans may, if desired, be brought up to the oven by a suitable conveyor 48.

During the proofing and baking operations, the dough swells and rises in the pan cavities, so as to close the ring and to mold the article, at least to some extent, into the twisted configuration represented by the walls of the cavities 24. Ordinarily, the expansion of the dough during proofing is sufficient to bring the ends of the bar rather tightly together, as represented by the bar 21b in Fig. 8. Thereafter, during the baking operation, the dough further rises and swells, pressing against the sides and bottom of each cavity, and likewise pressing against the under surface of the cover 40; and the ends of the bar are securely merged together. Thus Fig. 9 roughly illustrates the manner in which the baked ring 21c has expanded within the described enclosure. Also, as stated, the effect is to seal and indeed merge the ends of the loop automatically; indeed this result may be expected, if the dough bar is of sufficient bulk, even in some cases where its ends do not quite meet as originally placed in the pan cavity.

It will be noted that the nuts 36 are securely embedded in the under side of the ring, and the upper side, 49, as baked, is flattened in conformity with the cover surface. Although the cover may rise very slightly from the upper surface 23 of the pan during baking, the weight of the cover, and the quantity of dough utilized for each ring, are conveniently such that the amount of separation of the cover from the pan is quite small and is insufficient to impair the desired uniformity of size and character in the finished articles.

Upon completion of the baking operation, the pans are brought back to the opening 47 of the oven, conveniently in continuous succession, so that upon removal they are replaced by fresh pans of unbaked goods from the conveyor 48. Although other procedure may be employed, a convenient practice, in accordance with the present invention, is for the operator first to remove the covers 40 from the pans before removing the latter, and to place the covers, say, on the suitable conveyor 50, which takes them to a desired locality for cleaning and reuse. Thereupon the operator removes the finished pans 22b from the oven, turning each upside down as he does so, and placing it, for instance, on a suitable short conveyor 52. At the end of the short conveyor 52 another operator simply lifts the pans away from the baked rings, transferring the empty pans 22 to another suitable conveyor 54, which may, like conveyor 50, carry the pans to a place for cleaning and reintroduction into use.

Conveniently the pans may be removed from the inverted coffee rings as the latter traverse an intermediate transfer conveyor 55, comprising closely spaced rotating or rotatable rods extending transversely of the path of the goods. From the transfer section 55, the baked rings 21c move to the icing station. Although manual or other means may be employed for applying icing or other dressing to the baked articles, convenient apparatus for that purpose is such as that described and claimed in my co-pending application Serial No. 349,611, filed August 2, 1940, for Pastry icing apparatus, and issued June 1, 1943, as Patent No. 2,320,529, and accordingly such apparatus is indicated in the drawings. In this device, the rings 21c are carried on the longitudinal conveyor wires 56 past a device 57 which sprays the upper surfaces of the rings with a sugar wash or the like, and then past a further device 58 which sprays or spreads a coating of the desired icing composition over the upper surface of the articles. The rings are now finished and may be taken along to a wrapping or packaging station (not shown) where, for example, they may be placed in suitable boxes for transportation and delivery.

As previously explained, the rings are baked upside down, and at the end of the baking operation they have achieved conformity with the inner, spirally fluted configuration of the mold-like cavities 24 of the pans, and also with the cooperating flat surface of the pan covers 40—thus providing a flat bottom 49, see Fig. 9, for the finished rings 21c, in exact simulation of rings baked according to the older procedure described hereinabove. It will be noted that by reason of the substantially perpendicular relation of the upper end of the walls of the cavity 24 (i. e., with only a slight overhang of the surface 23, or in some cases no overhang), especially in cooperation with the flat cover 49, the surfaces of the rings immediately adjacent the flat or "bottom" surface 49, slope toward the last mentioned surface and are free from contact with any part of the metallic pan and cover assembly. These inwardly tapering portions 60 of the finished coffee ring (Fig. 10), which thus extend around the inner and outer edges of what is eventually the bottom of the ring, bake only to a relatively white or lighter color with respect to the remaining portions (usually brown) of the ring surface. This effect avoids the undesirable condition of a complete, unbroken crust all about the article, and enhances resemblance to rings baked in the older or "home-made" way, which have just such a "break" or lighter portion around the base.

It will now be seen that the procedure involves very considerable advantage and economy throughout. In the first place, there is no waste whatever of nuts or other materials desired to be applied to the top of the finished goods; all of the nuts used are placed in the cavities in the baking pans as shown in Fig. 1 and they all adhere to the surface of the ring—the adherence being promoted by the subsequent rising and expansion of the dough as confined in the covered pan, so that when the pan is removed from the oven, turned upside down and lifted from the baked rings, all of the nuts are firmly embedded in the upper ring surface. There is no need for attempt to recover spilled materials (since none are spilled or lost at any point in the process), and no need to use any more of these relatively expensive commodities than is actually desired for the finished goods.

Further advantages include simplification of the entire procedure, by handling the goods throughout in the same pans, by avoiding the necessity for overlapping, and squeezing or otherwise twisting the ends of the ring together, and by simplifying the removal of the cakes from the pans. Thus instead of lifting the rings successively out of an ordinary flat bottom pan, the only procedure required is that described, wherein the pans are inverted and then lifted away from the rings. At the same time the operation may be such, as described, that the rings are immediately in position and ready for final treatment, as at the icing station; and there need be no intermediate dipping, or other handling.

Although in some instances it may be desirable to provide an actual twist in the rods or rolls of dough 21 before they are placed in the pans (in order to improve or insure the twisted appearance of the final ring), the twisting operation may in many cases be dispensed with, as in the procedure shown. The simple operations of inserting the straight rod or roll in the pan cavities, and the subsequent automatic enlargement of the dough therein, are in many cases adequate to provide a satisfactory twisted appearance for the final article, as generally indicated in Fig. 10. The entire procedure is admirably adapted for continuous operation in commercial baking establishments, with a minimum of manual operations and with a complete avoidance of slow or awkward handling or transferring steps at any stage, either in the preparation of the dough forms or their insertion in the pans, or in the handling for proofing, or the loading and unloading of the pan assemblies to and from the oven, or in the subsequent operations on the baked rings or in applying nuts or other dressings.

Finally, the process insures the manufacture of uniform products; all the finished rings look substantially alike and have the dimensions which are desired both for best appearance and for best results in baking, e. g., as to the texture, flavor and freshness of the finished goods. Ordinarily, it is difficult to prevent coffee rings made in the older way from coming out flat, i. e., with the vertical dimension very substantially smaller than the width from outside to inside. A flattened or flat-looking ring, generally looks less appetizing than a full, round one, and seems to have risen insufficiently to provide the lightness and freshness which is ordinarily preferred. Indeed, a flat ring is usually not as satisfactory a product, and is likely to have dried out or baked harder, particularly in some portions, than is representative of preferred results. Even by careful control of such factors as dough consistency and character, and the time and conditions in the oven, it has not been possible in the older type of bakery operation to make such articles as coffee rings in any degree of uniform conformity with a desired standard of size and quality. The present procedure, however, greatly facilitates such results, particularly in avoidance of flatness and in general uniformity of quality, and minimizes the possibly adverse effect of many unpredictable variables, of human or other origin.

Contributing substantially to the foregoing and other desirable results of the invention is the important feature that the coffee ring is baked upside down and with the eventual top not exposed in the oven. In addition to what has been said concerning the advantageous effects of the procedure, and the various savings involved, it may be pointed out that the elimination of the preliminary coating heretofore necessary for adherence of dressing materials is a very substantial economy. For best adhesive action and ultimate appearance, an egg wash has been preferred, but because of its expense, many bakers have been forced to dilute it with a milk wash, which, taken alone, is relatively ineffective. By my process, such washes can be entirely eliminated. At the same time, by baking upside down, the top and sides of the rings can be easily brought to a desirable brown color, uniform for all the rings and uniform over the surfaces of each ring, without the irregularity, burning or under-baking which has prevented such results in the past. In my method of making coffee ring, the surfaces of each article in its pan, particularly the surfaces to be the eventual top and sides, are brought into immediate contact, in effect, with the hearth, affording a distinctly better heating action. And finally, the removal of the goods from the pan involves merely an easy inversion of the pan, i. e., the goods are simply dumped out and are immediately ready for further treatment.

Although the procedure and apparatus have been described as applied to a specific set of operations in the manufacture of one kind of coffee ring or analogous pastries, it will be understood that similar equipment and steps may be utilized for other articles to have twisted, braided or other special surface configurations which may be achieved by mold-like pans of the general character disclosed. At least many features of the described improvements are applicable to a wide variety of baked articles, not only those made of yeast dough, but other types of goods, including cup cakes and various kinds of buns, muffins, and so forth—particularly where it is desired to apply materials such as nuts, icing or other dressing articles or compositions to the surface of the product.

It will be understood that the invention is not limited to the specific embodiments herein shown or described, but may be carried out in other ways without departure from its spirit as defined by the following claims.

I claim:

1. Procedure for the manufacture of baked articles to have a predetermined ring-shaped configuration, comprising disposing elongated yeast dough portions in ring-shaped cavities of pans having such cavities, said dough portions comprising elongated rolls made by rolling yeast dough strip into the roll shape with dressing material intermediate the convolutions thereof, covering the pans to enclose the cavities and to provide with the latter an enclosure of the aforesaid predetermined configuration, and causing expansion of the dough portions in the pans by treating the dough portions therein, while keeping the pans covered, by procedure including baking, whereby the ends of each dough portion are secured and baked together, and whereby the predetermined configuration is imparted to the baked rings.

2. Procedure for the manufacture of a baked article to have at upper surfaces thereof a predetermined configuration including depressions and raised portions, comprising disposing a yeast dough portion in a pan cavity opening upwardly and having the aforesaid predetermined configuration and while maintaining the pan with its cavity opening uppermost, subjecting the dough in said cavity to procedure including baking, for expansion of the dough against the surface of the cavity, whereby the resulting baked article has surfaces conforming with the predetermined configuration and baked to a substantially uniform finish.

JOHN MacMANUS.